Sept. 1, 1964 — J. I. YELLOTT — 3,146,774
FILM-TYPE SOLAR WATER HEATER
Filed Aug. 8, 1961
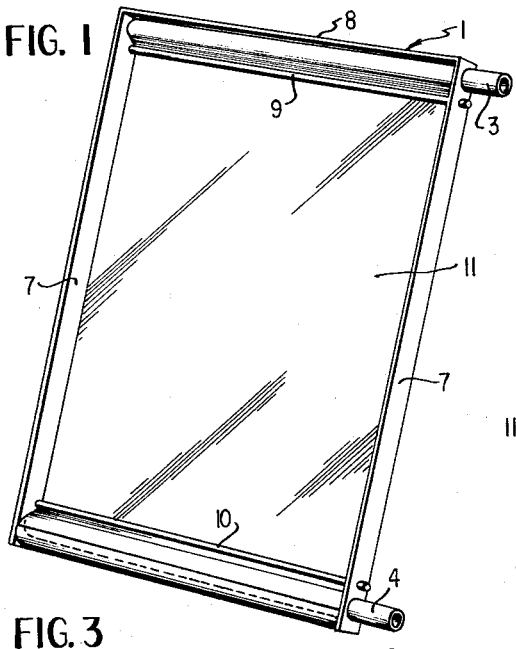
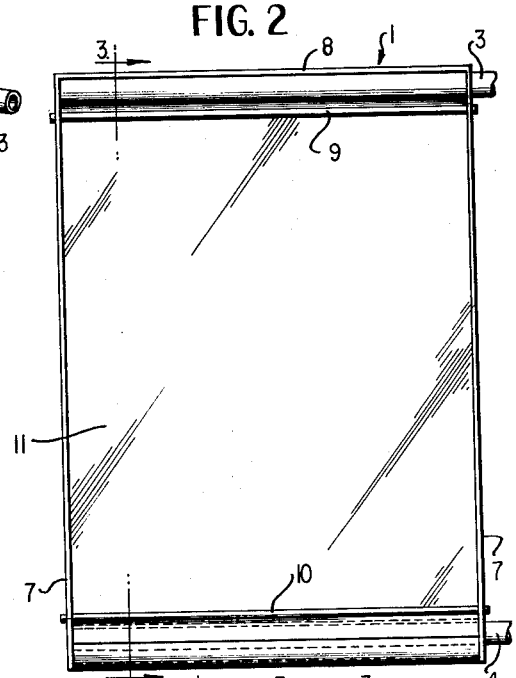
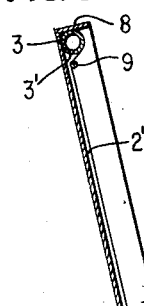
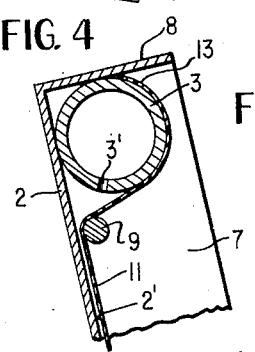
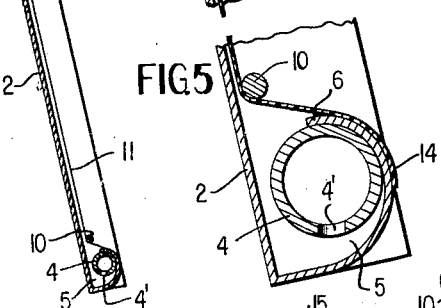
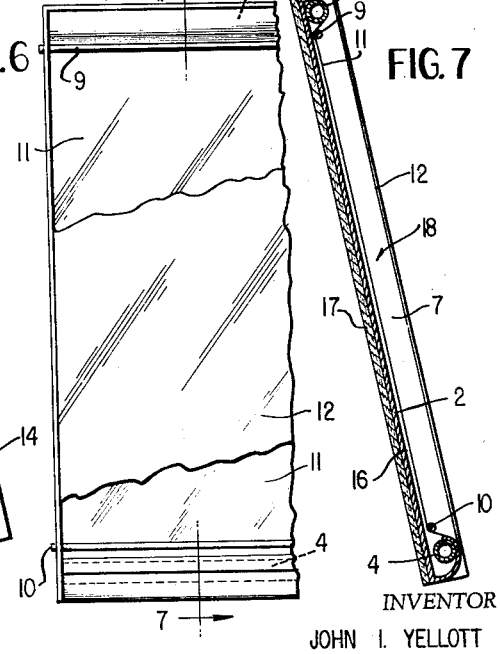
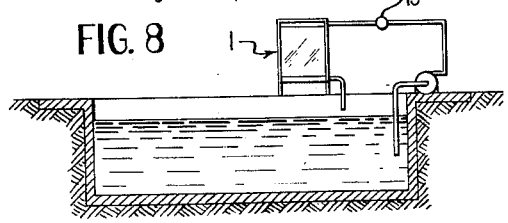
INVENTOR
JOHN I. YELLOTT
BY Gardner J. O'Boyle
ATTORNEY United States Patent Office 3,146,774
Patented Sept. 1, 1964

3,146,774
FILM-TYPE SOLAR WATER HEATER
John I. Yellott, 901 W. El Caminito, Phoenix, Ariz.
Filed Aug. 8, 1961, Ser. No. 130,175
3 Claims. (Cl. 126—271)

This invention relates to solar water heaters, and more particularly to a film-type solar water heater for use with swimming pools, cisterns, tanks, and the like, wherein a relatively large volume of water is to be heated through a small temperature rise.

Heretofore it has been suggested to provide solar water heaters comprising a rigid backing sheet formed from metal or plastic, a perforated inlet tube at the upper end of the sheet, and a slotted bottom collector tube or header. The heater is adapted to be supported in an inclined position with respect to the horizontal so as to be exposed to the sun, and when water is introduced into the inlet tube at the top of the sheet it flows downwardly thereof into the header, and thence to a storage tank or use device.

One of the disadvantages of the above described arrangement is that the water flows down the backing sheet in small individual streams or rivulets, and as a result only a small amount of heat is collected by the heater because of the relatively small area of the streams or rivulets. Another disadvantage of heaters of this type, is due to the fact that the streams of water flowing down the inclined metallic sheet are exposed to the ambient air and, accordingly, the water can lose as much heat by evaporation as it can gain by exposure to the sun, and additionally, water flowing down the inclined metallic sheet will pick up dust and other foreign materials from the ambient air.

An object of my invention is to provide an improved solar water heater wherein water flowing downwardly of a backing sheet is caused to spread itself into a uniform, thin film or layer, covering substantially the entire area of the sheet.

Another object of my invention is to provide a solar water heater having a backing sheet and an overlying thin plastic film, whereby the surface tension of the water flowing between the film and the backing sheet draws the film in the direction of the backing sheet until only a very thin layer of water flows between the plastic film and the backing sheet.

Yet another object of my invention is to provide an improved film-type solar water heater wherein the water contacting surface of the rigid backing sheet is painted a dark, heat-absorbing color.

Still another object of my invention is to provide an improved film-type solar heater wherein the backing sheet, inlet tube, and the bottom header are formed from plastic materials.

A still further object of my invention is to provide an improved film-type solar heater wherein the water contacting surface of the backing sheet is painted a dark, heat-absorbing color, and the opposite surface of the sheet is covered with a heat insulating material, the water contacting surface being covered with a first overlying plastic film; and a second plastic film secured to the backing sheet in spaced relationship with respect to said first plastic film, whereby to form a dead air space and thus minimize convection.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful application to the particular construction which, for the purpose of explanation, have been made the subject of illustration.

In the drawings:

FIG. 1 is a perspective view of the improved solar water heater;

FIG. 2 is a front elevational view of the solar heater shown in FIG. 1;

FIG. 3 is a sectional view taken on line 3—3 of FIG. 2;

FIG. 4 is a sectional detail view of the upper end of the heater, showing the water inlet tube, and the arrangement of the plastic film;

FIG. 5 is a sectional detail view of the lower end of the heater, showing the bottom header;

FIG. 6 is a front elevational view of a modification of the solar water heater;

FIG. 7 is a sectional view taken along line 7—7 of FIG. 6; and

FIG. 8 is a diagrammatic view showing the solar water heater in use with a swimming pool.

Referring to the drawings and more particularly to FIGS. 1–3, the improved solar water heater, designated generally by the numeral 1, comprises a rigid backing sheet 2 of metal, plastic or other suitable water impervious material, a water inlet tube 3, having perforations 3' therein, secured to the upper portion of the backing sheet, and a collector tube or header 4, formed with a slot 4', secured to the lower portion of the sheet. The inlet tube 3 may be secured to the upper portion of the backing sheet by welding, or by other suitable securing means. The header 4 is secured to the lower portion of the backing sheet by bending the lower end portion of the sheet around the header so as to form an annular chamber 5 concentric with the header (FIGS. 3 and 5), the lower edge 6 of the backing sheet being secured to the header as by welding or other suitable means.

The backing sheet 2 is formed with side flanges 7, and a top flange 8, the side flanges being adapted to support transverse guide rods 9 and 10 used in mounting a pliable plastic film 11 which overlies the water contacting surface of the sheet, the top flange serving as a support for one end of a plastic film 12 (FIG. 7) mounted in spaced relation with respect to the film 11, as will be described more fully hereinafter.

In order to cause the water flowing downwardly of the backing sheet from the inlet tube 3 to spread into a uniform thin layer, covering substantially the entire area of the sheet, the pliable film 11, having a thickness of the order of 1/1000 of an inch, is mounted adjacent the water contacting surface of the backing sheet by threading the end portions 13 and 14 of the film between the inlet tube 3 and the rod 9, and the bottom header 4 and rod 10, respectively, and then securing the end portions of the film to the respective adjacent inlet tube and bottom header, the lateral edges of the film adjacent side flanges 7 being free to move relative thereto.

In the above described solar heater arrangement, relatively cool water from a swimming pool, for example, enters the inlet tube 3, flows outwardly therefrom through the perforations 3', and downwardly of the backing sheet 2, between the blackened surface 2' thereof and the plastic film 11. Due to the surface tension of the water, the film is drawn in the direction of the surface 2' of the backing sheet until a very thin layer of water flows between the film and the sheet. The plastic film 11 extends over the entire wetted surface of the backing sheet, effectively preventing evaporation, and causing a thin film or layer of water of substantially uniform thickness to exist between the sheet and the overlying plastic film. The relatively warm water collected in the annular chamber 5 flows through the slotted portion 4' of the header and axially outward thereof, and returns to the swimming pool.

The provision of means by which the water can be caused to spread itself into a uniform, thin film, covering the entire surface of the backing sheet, and carrying away the heat absorbed by the sheet, is an important feature of the present invention. As far as I am aware, no one has used the phenomenon of surface tension in the manner described herein, to obtain a thin, uniform layer of water, which is in complete contact with the plastic film, thus producing the highest possible efficiency. In this connection it will be noted that the plastic film acts both to prevent evaporation, and maintain a thin layer of flowing water. It will be further noted that since the flowing layer of water is not exposed to the ambient air it cannot pick up airborne dust or other foreign particles.

If it is desired to heat the water to a higher temperature, the rate of flow of water entering the inlet tube 3 can be cut down by suitable valve means 15 (FIG. 8), until there is just enough flow to maintain a thin layer of water over the surface of the backing sheet. Under this arrangement the back surface 16 (FIG. 7) of the backing sheet is provided with a suitable insulating material 17 to minimize the loss of heat to the ambient air, and a second plastic film 12 is provided, having its upper end secured to the flange 8, the lower end of the film being secured to the inturned portion of the backing sheet at the bottom of the heater, and the side edges of the film being secured to the flanges 7, thereby forming a dead air space 18 to minimize loss of heat by convection.

The improved solar water heater of the present invention functions equally well in the vertical or in the inclined position since it depends upon gravity to make the water flow downward and surface tension to maintain the plastic film 11 tightly against the flowing sheet of water. Accordingly, the heater may be supported in vertical position on, or made part of, a fence around a swimming pool. When the heater is used in conjunction with a fence, if the rigid backing sheet is of metal, painted with a dark, heat-absorbing color, it will transfer heat to the flowing layer of water whenever either side of the sheet "sees" the sun.

Since the heater is particularly adapted for use with swimming pool water, which is normally maintained in an acidic condition to prevent the growth of algae, the backing sheet, water inlet tube, and the bottom header can all be made of plastic materials which are unaffected by acidic water. It will also be appreciated that the improved heater is adapted for cooling swimming pool water at night, in the summer, by radiation of heat from the plastic film or cover 11, since the emissivity of its surface for long wave radiation is about 0.9, while its transmissivity for solar radiation is about 0.95.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A solar water heater of the character described, comprising a rigid, planar, backing sheet having one surface thereof painted a dark, heat-absorbing color, said backing sheet being supported in an inclined position with respect to the horizontal so as to be exposed to the sun, a water inlet tube mounted in the vicinity of the upper end of the backing sheet, said tube including means for discharging a stream of water transversely along the backing sheet, a water collecting header mounted on the lower end portion of said backing sheet, means for introducing water into the inlet tube to provide a gravitational flow of water of capillarly thickness down the surfaces of the inclined backing sheet, a thin pliable plastic film overlying the water contacting surface of the backing sheet, one end of the plastic film being secured to the water inlet tube and the opposite end of the plastic film being secured to the collecting header, the lateral edges of the plastic film being free from connection to the backing sheet, and means operatively connected to the backing sheet for maintaining the pliable plastic film closely adjacent and parallel to the water contacting surface of the backing sheet, whereby the surface tension of the thin film of water flowing gravitationally downwardly of the backing sheet draws the plastic film in the direction of the water contacting surface of the backing sheet, thereby causing the water flowing downwardly thereon to spread into a thin, uniform layer covering substantially the entire area of the backing sheet.

2. A solar water heater in accordance with claim 1, wherein the rigid backing sheet, water inlet tube, and the water collecting header are formed from plastic materials.

3. A solar water heater of the character described, comprising a rigid planar backing sheet having a dark, heat-absorbing surface and an opposite surface covered with a heat insulating material, said backing sheet being supported in an inclined position with respect to the horizontal so as to be exposed to the sun, a perforated water inlet tube mounted at the upper end of the backing sheet, said tube including means for discharging a stream of water transversely along the heat-absorbing surface of the sheet, a slotted water collecting header mounted at the opposite end of the backing sheet, a first pliable, plastic film overlying the water contacting surface of the backing sheet, one end of the plastic film being secured to the water inlet tube and the opposite end of the plastic film being secured to the collecting header, the lateral edges of the plastic film being free from connection to the backing sheet, means operatively connected to the backing sheet for maintaining the pliable plastic film closely adjacent and parallel to the water contacting surface of the backing sheet, whereby the surface tension of the thin film of water flowing gravitationally downwardly of the backing sheet draws the plastic film in the direction of the water contacting surface of the backing sheet, thereby causing the water flowing downwardly of the sheet to spread into a thin, uniform layer covering substantially the entire area of the backing sheet, and a second plastic film mounted on said backing sheet on the same side of the backing sheet as the first plastic film, said plastic film being in spaced relation and parallel to said first plastic film, thereby forming a dead air space between the films to thus minimize convection.

References Cited in the file of this patent

UNITED STATES PATENTS

| 2,608,968 | Moseley | Sept. 2, 1952 |
| 2,705,948 | Rostock | Apr. 12, 1955 |
| 2,998,006 | Johnston | Aug. 29, 1961 |
| 3,022,781 | Andrassy | Feb. 27, 1962 |
| 3,029,806 | Okuda | Apr. 17, 1962 |
| 3,052,228 | Okuda | Sept. 4, 1962 |
| 3,076,450 | Gough et al. | Feb. 5, 1963 |
| 3,077,190 | Allen | Feb. 12, 1963 |

FOREIGN PATENTS

| 28,130 | Great Britain | of 1907 |
| 763,867 | France | Feb. 19, 1934 |
| 840,926 | France | Jan. 28, 1939 |